United States Patent
Carpenedo

(10) Patent No.: US 10,765,062 B2
(45) Date of Patent: Sep. 8, 2020

(54) COMBINE HARVESTER UNLOADING SYSTEM

(71) Applicant: AGCO DO BRAZIL COMERCIO E INDUSTRIA LTDA, Canoas (BR)

(72) Inventor: Marcelo Carpenedo, Canoas (BR)

(73) Assignee: AGCO DO BRASIL SOLUÇÕES AGRÍCOLAS LTDA, Ribeireo Preto, SP (BR)

( * ) Notice: Subject to any disclaimer, the term of this patent is extended or adjusted under 35 U.S.C. 154(b) by 131 days.

(21) Appl. No.: 15/767,717

(22) PCT Filed: Oct. 24, 2016

(86) PCT No.: PCT/IB2016/001547
§ 371 (c)(1),
(2) Date: Apr. 12, 2018

(87) PCT Pub. No.: WO2017/077374
PCT Pub. Date: May 11, 2017

(65) Prior Publication Data
US 2018/0295776 A1    Oct. 18, 2018

(30) Foreign Application Priority Data

Nov. 5, 2015 (GB) .................. 1519526.6

(51) Int. Cl.
*A01D 41/12* (2006.01)
*B60P 1/42* (2006.01)
*B65G 33/08* (2006.01)

(52) U.S. Cl.
CPC ..... *A01D 41/1217* (2013.01); *A01D 41/1208* (2013.01); *B60P 1/42* (2013.01);
(Continued)

(58) Field of Classification Search
CPC ............ A01D 41/1217; A01D 41/1208; A01D 41/1275; B60P 1/42; B65G 2201/042;
(Continued)

(56) References Cited

U.S. PATENT DOCUMENTS 1,811,064 A * 6/1931 Raney .................... A01F 12/46
                                                          198/661
2,776,078 A * 1/1957 Raynor ................ B65D 90/582
                                                          222/413

(Continued)

FOREIGN PATENT DOCUMENTS

EP     0075034 A1    5/1983
GB     1272504 A     5/1972
(Continued)

OTHER PUBLICATIONS

UK Intellectual Property Office, International Search Report for priority Application No. GB1519526.6, dated Apr. 21, 2016.
(Continued)

*Primary Examiner* — Arpad Fabian-Kovacs

(57) ABSTRACT

A combine harvester including a grain tank having an auger trough in which a screw conveyor of an unloading system is disposed. The screw conveyor is operable to define an upturning side and a downturning side. The grain tank includes a floor section that covers the upturning side to prevent back flow and the formation of a stagnation zone in the vicinity thereof.

20 Claims, 2 Drawing Sheets

(52) U.S. Cl.
CPC ...... *B65G 33/08* (2013.01); *B65G 2201/0202* (2013.01); *B65G 2201/042* (2013.01)

(58) Field of Classification Search
CPC .. B65G 2201/0202; B65G 33/08; A01F 12/46
See application file for complete search history.

(56) References Cited

U.S. PATENT DOCUMENTS

| | | | | |
|---|---|---|---|---|
| 3,045,804 | A * | 7/1962 | Peterson | A01D 41/1208 198/550.1 |
| 3,070,221 | A * | 12/1962 | Bobrowski | B65G 33/24 198/671 |
| 3,568,863 | A * | 3/1971 | Rohwedder | A01D 41/1208 414/526 |
| 3,664,525 | A * | 5/1972 | Herbsthofer | A01D 41/1217 414/326 |
| 3,841,536 | A * | 10/1974 | Maiste | A01D 41/1208 222/503 |
| 4,220,434 | A | 9/1980 | Letzig | |
| 5,830,062 | A * | 11/1998 | Schwinn | A01F 12/44 460/100 |
| 6,358,143 | B1 * | 3/2002 | Hurlburt | A01D 41/1208 414/502 |
| 6,367,234 | B1 * | 4/2002 | Hurlburt | A01D 41/1208 460/114 |
| 9,736,985 | B2 * | 8/2017 | Vandevelde | A01F 12/46 |
| 10,390,489 | B2 * | 8/2019 | Winsnes | B65G 45/005 |
| 2012/0237325 | A1 | 9/2012 | Flickinger et al. | |
| 2014/0274233 | A1 | 9/2014 | Michels et al. | |
| 2015/0156968 | A1 | 6/2015 | Lauwers | |
| 2016/0113203 | A1 * | 4/2016 | Missotten | A01F 12/46 460/114 |
| 2016/0316632 | A1 * | 11/2016 | Vandevelde | A01F 12/46 |
| 2018/0295776 | A1 * | 10/2018 | Carpenedo | B60P 1/42 |

FOREIGN PATENT DOCUMENTS

| | | |
|---|---|---|
| GB | 1493429 A | 11/1977 |
| GB | 2056399 A | 3/1981 |
| JP | H043711 A1 | 7/1993 |
| SU | 452976 A1 | 12/1974 |
| WO | 2014/019638 A1 | 2/2014 |

OTHER PUBLICATIONS

European Patent Office, International Search Report for International Application No. PCT/IB2016/001547, dated Feb. 2, 2017.
The Free Dictionary, https://www.thefreedictionary.com; printed Dec. 11, 2019.
dictionary.com, https://www.dictionary.com; printed Dec. 11, 2019.

* cited by examiner

US 10,765,062 B2

COMBINE HARVESTER UNLOADING SYSTEM

FIELD OF INVENTION

The invention relates to combine harvesters and particularly to unloading systems for unloading on-board grain tanks.

BACKGROUND

Combine harvesters have on-board grain tanks to hold the harvested crop before being discharged to a trailer through an unloading system. Grain tanks are typically designed to include a narrowed region or trough towards the bottom of the tank in which a transverse screw conveyor (or cross auger) of the unloading system is located. The tanks are normally designed to avoid horizontal surfaces on which grain could become trapped, and so the sidewalls are either vertical or sloped. During unloading, the grain is carried away by the cross auger and the sloping sidewalls steer the grain into the trough to allow for complete emptying of the tank.

The cross auger rotates on a substantially transverse rotation axis. A cover plate is commonly provided to partially cover the cross auger and regulate the flow of grain from the tank to the auger. The cover plate typically leaves an opening to both the front and to the rear thereof through which the grain passes. In some designs of grain tank grain only flows through one of the openings once the level has dropped during an unloading event. Reduced unloading rates have been observed in some instances when the grain level drops below one of the openings in this way.

SUMMARY OF INVENTION

It is one object of the invention to improve the flow of grain to the unloading system especially at reduced grain levels.

According to the invention there is provided a combine harvester comprising a grain tank having an auger trough in which a cross auger of an unloading system is disposed, the cross auger being operable to define an upturning side and a downturning side, wherein the grain tank comprises a floor section that covers the upturning side.

An aspect of the invention involves the recognition that, in known grain tank designs, a stagnation zone can occur in the vicinity of the upturning side of the cross auger around which grain flow toward the cross auger is inhibited. In such known systems, the upturning side of the cross auger serves to push grain away rather than draw the grain into the trough. By covering the upturning side, and thus directing the grain into the downturning side only, then the stagnation zone is eliminated and grain flow speeds are maintained even at reduced grain levels.

In one example embodiment the auger trough is disposed transversely with respect to a forward direction of travel.

The floor section preferably slopes downwardly towards the auger trough to improve the flow of grain thereto and to assist in complete emptying of the tank during unloading.

The upturning side of the cross auger is preferably covered across the full width of the auger trough thereby reducing any back pressure effects of the upturning side.

In one embodiment the auger trough resides adjacent a front side of the grain tank and the downturning side of the cross auger resides adjacent the front side.

BRIEF DESCRIPTION OF THE DRAWINGS

Further advantages will become apparent from reading the following description of specific embodiments of the invention with reference to the appended drawings in which.

DETAILED DESCRIPTION OF SPECIFIC EMBODIMENTS

Figure 1:
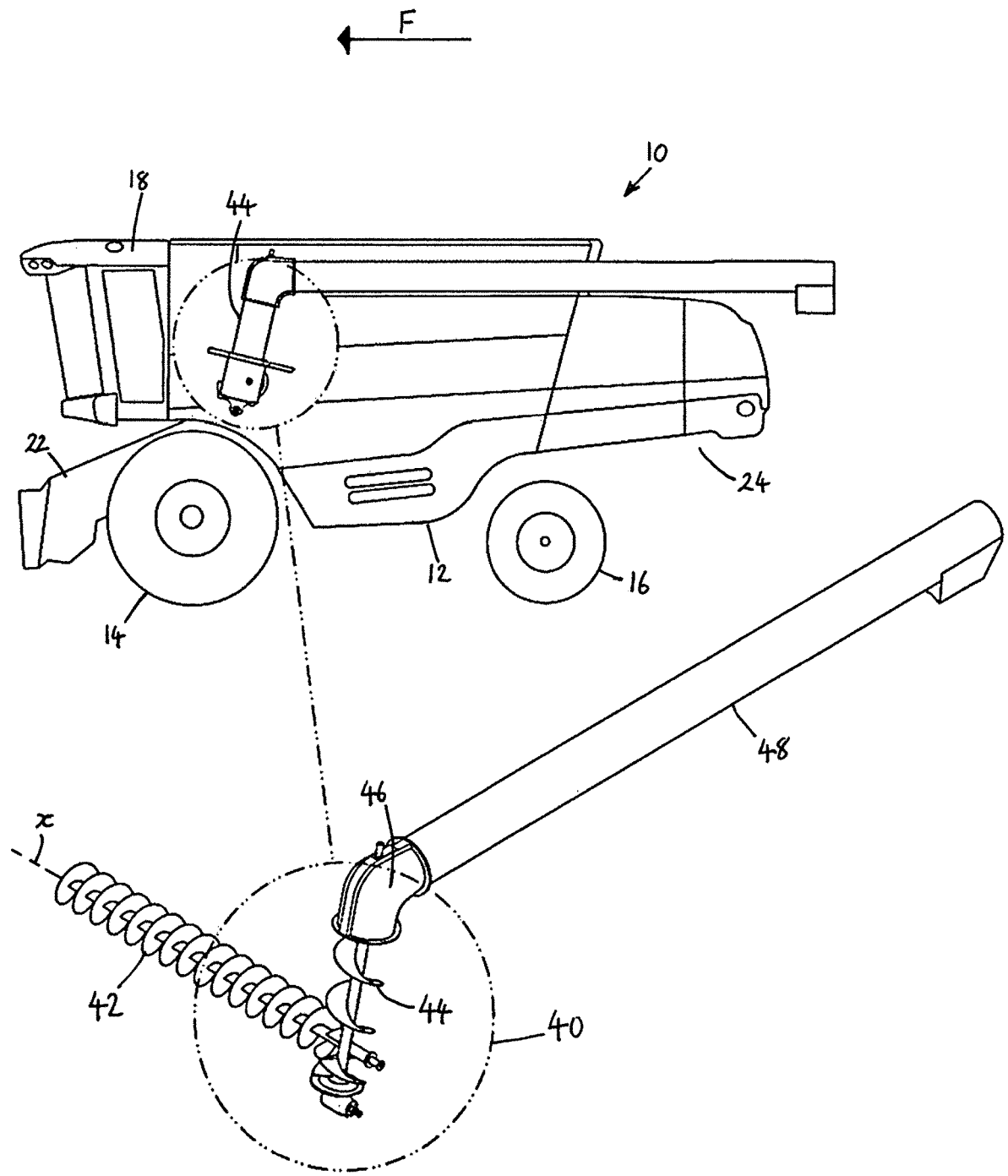
FIG. 1 is a left-hand schematic side view of a combine harvester in accordance with an embodiment of the invention including a perspective view of the unloading system included therein.

Relative terms such as 'front', 'rear', 'left', 'right', 'longitudinal' and 'transverse' will be made with reference to the longitudinal axis of a combine harvester travelling in the normal forward direction of travel indicated by arrow F in FIG. 1.

In one embodiment of the invention, a combine harvester 10, hereinafter referred to as 'combine', includes a frame 12 supported on front wheels 14 and rear steerable wheels 16 which engage the ground. A driver's cab 18 is also supported on the frame 12 and houses a driver's station from where a driver controls the combine 10.

A cutting header (not shown) may be detachably supported on the front of a feederhouse 22 which is pivotable about a transverse axis to lift and lower the header in a conventional manner.

The combine 10 is driven in a forward direction (arrow F) across a field of standing crop in a known manner. The header serves to cut and gather the standing crop material before conveying such as a crop material stream into feederhouse 22. An elevator (hidden from view) is housed within the feederhouse 22 and serves to convey the crop material stream upwardly and rearwardly from the header to the crop processor which is also hidden from view.

The crop processor serves to thresh and separate grain from the crop material before ejecting the residue from the rear of the machine 24. The separated grain is cleaned before being conveyed into a grain tank 30, which is supported by frame 12 and an outline of which is shown in FIG. 2.

Figure 2:
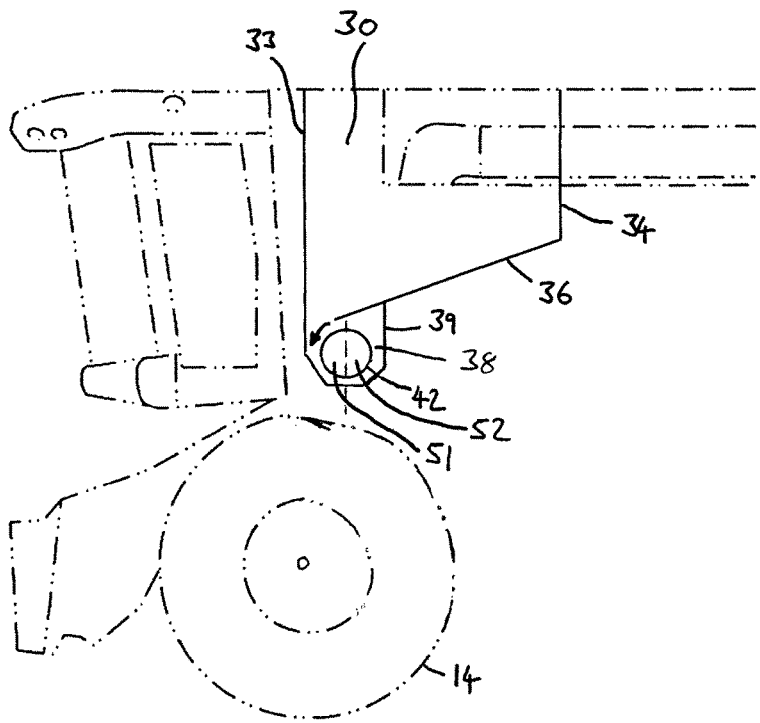
FIG. 2 is a left-hand schematic side view of the grain tank and cross auger of the combine harvester of FIG. 1 and showing part of the combine harvester in ghost form; and, FIG. 3 is a plan view of the auger trough of the unloading system of the grain tank of FIG. 2.

With reference to FIG. 2, the grain tank 30 is revealed and comprises front and rear vertical sidewalls 33, 34, left and right sidewalls, and a floor 36 which slopes forwardly and downwardly from a base of the rear sidewall 34. The tank sidewalls 33, 34 and floor 36 extend across the full width of the harvester 10.

Although not shown, a top portion of the grain tank volume may be defined by foldable extension members which may comprise a flexible fabric material and rigid struts which collapse down in a closed mode and open upwardly extending above the harvester frame as shown in an open mode. U.S. Pat. No. 6,679,772, the contents of which is incorporated herein by reference, discloses an example of such foldable grain bin extensions.

The grain tank 30 further comprises an auger trough 38 which extends transversely across the width of the tank 30. The auger trough 38 itself is disposed at a height below the sloping floor 36 and comprises a rear wall panel 39.

The combine 10 further comprises an unloading system 40 configured to unload the grain from the grain tank 30 and discharge the grain into a trailer which is driven alongside.

Shown in FIG. 1, the unloading system 40 comprises a cross auger 42 in the form of a screw conveyor and is operable to rotate on a transverse axis x. The cross auger 42 is located in the auger trough 38 and serves to move grain from right to left so as to feed an upright screw conveyor 44. An elbow section 46 couples a horizontal discharge auger 48 to the top of upright conveyor 44. Together, the upright conveyor 44, elbow section 46 and discharge auger 48 form a known turret-style unloading system.

The cross auger 42, together with the upright auger 44 and discharge auger 48, are selectively activated and deactivated by a controller which may be located in the cab 18. When desired, typically when the grain tank 62 is full or nearly full, the unloading system is activated by an operator command, and the augers 42, 44, 48 rotate to empty the tank 30.

The cross auger 42 in the illustrated embodiment rotates on axis x in an anti-clockwise direction when viewed from the left-hand side of the combine 10 and as viewed in FIG. 2. This direction of rotation defines a downturning side 51 which is forward of the axis x, and an upturning side 52 which is rearward of the axis x.

Figure 3:
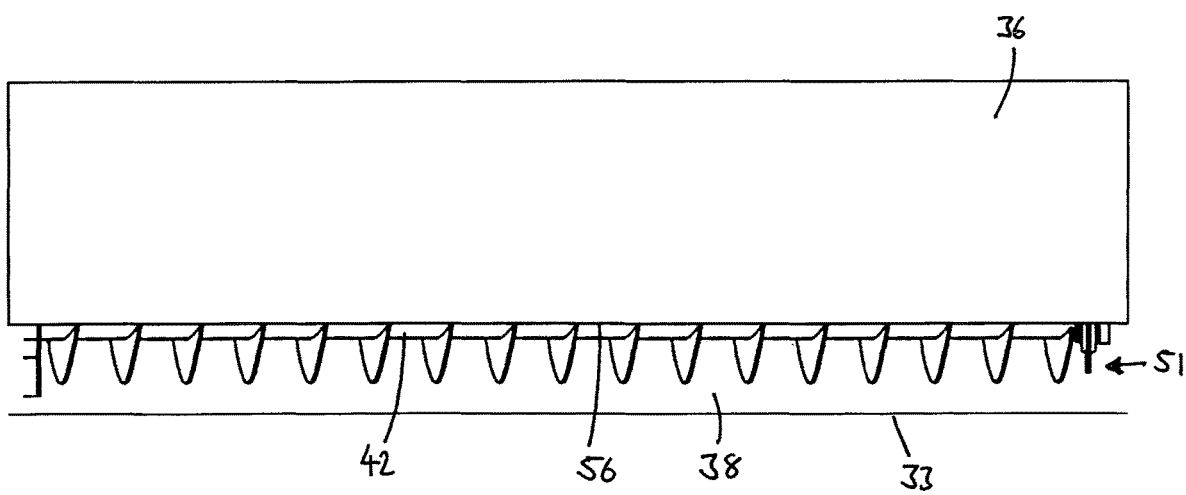

In accordance with an aspect of the invention, the upturning side 52 is covered by floor panel 36 leaving only the downturning side exposed to the tank 30 as seen in FIG. 3. It has been observed that covering the upturning side 52 in this manner prevents the formation of a stagnation zone in the vicinity thereof and, in turn, maintains the unloading rate when the grain level drops during unloading.

Furthermore, the auger trough 38 is disposed below the main floor panel 36 to allow substantially the whole contents of the tank 30 to be directed into the opening directly above the downturning side 51.

The floor panel 36 comprises a discharge edge 56 from which the grain falls into the trough 38. The discharge edge 56 is parallel to the auger trough 38 and to the rotation axis x of the cross auger 42. In a preferred arrangement, the discharge edge 56 resides directly above the auger trough 38 and above the rotation axis x so as to cover the upturning side 52 while leaving the downturning side 51 exposed.

In another embodiment which is not illustrated, the cross auger 42 rotates in the opposite direction to that described above. In this case, the upturning side is positioned forward of the downturning side and a floor panel of the tank covers the upturning side.

Although described as a turret-style unloader, it should be appreciated that other unloader designs may be employed without deviating from the scope of the invention.

Although described as comprising a single cross auger, it should be appreciated that the unloading system may instead comprise two or more cross augers wherein at least one has an upturning side that is covered by a floor section.

In summary there is provided a combine harvester which comprises a grain tank having an auger trough in which a screw conveyor of an unloading system is disposed. The screw conveyor is operable to define an upturning side and a downturning side. The grain tank comprises a floor section that covers the upturning side to prevent back flow and the formation of a stagnation zone in the vicinity thereof.

The invention claimed is:

1. A combine harvester comprising a grain tank having an auger trough in which a cross auger of an unloading system is disposed, the cross auger being operable to define an upturning side and a downturning side, wherein the grain tank comprises a generally planar floor panel having a discharge edge parallel to a rotation axis of the cross auger, wherein the generally planar floor panel covers the upturning side and leaves the downturning side exposed.

2. The combine harvester according to claim 1, wherein the auger trough is disposed transversely with respect to a forward direction of travel of the combine harvester.

3. The combine harvester according to claim 1, wherein the generally planar floor panel slopes downwardly towards the auger trough.

4. The combine harvester according to claim 1, wherein the upturning side is covered across a full width of the auger trough.

5. The combine harvester according to claim 1, wherein the auger trough resides adjacent a front side of the grain tank.

6. The combine harvester according to claim 5, wherein the downturning side resides adjacent the front side.

7. The combine harvester according to claim 1, further comprising a turret unloading system having an upright conveyor configured to be fed by the cross auger located in the auger trough, and a horizontal conveyor which is pivotable about a vertical axis between a transport position and an unloading position, wherein the horizontal conveyor is configured to be fed by the upright conveyor.

8. The combine harvester according to claim 1, wherein the discharge edge is directly above the auger trough.

9. The combine harvester according to claim 8, wherein the discharge edge is directly above the rotation axis of the cross auger.

10. The combine harvester according to claim 1, wherein the auger trough comprises a rear wall panel below the generally planar floor panel.

11. The combine harvester according to claim 1, wherein the auger trough is below the generally planar floor panel.

12. The combine harvester according to claim 1, wherein the cross auger is below the generally planar floor panel.

13. The combine harvester according to claim 1, wherein the generally planar floor panel covers the upturning side of the cross auger directly opposite the exposed downturning side across the rotation axis of the cross auger.

14. A combine harvester comprising a grain tank having an auger trough in which a cross auger of an unloading system is disposed, the cross auger being operable to define an upturning side and a downturning side, wherein the grain tank comprises a generally planar floor section having a discharge edge parallel to a rotation axis of the cross auger, wherein the generally planar floor panel covers the upturning side and leaves the downturning side substantially exposed.

15. A combine harvester comprising:
a grain tank having a generally planar floor section extending over an auger trough;
a cross auger disposed in the auger trough, the cross auger being operable to define an upturning side and a downturning side, wherein the generally planar floor section has a discharge edge parallel to a rotation axis of the cross auger, and wherein the generally planar floor section covers the upturning side and leaves the downturning side substantially exposed.

16. The combine harvester according to claim 15, wherein the generally planar floor section slopes downwardly over the auger trough.

17. The combine harvester according to claim 15, wherein the discharge edge is directly above the auger trough.

18. The combine harvester according to claim 17, wherein the discharge edge is directly above the rotation axis of the cross auger.

19. The combine harvester according to claim 15, wherein the cross auger is below the generally planar floor section.

20. The combine harvester according to claim 15, wherein the generally planar floor section covers the upturning side of the cross auger directly opposite the exposed downturning side across the rotation axis of the cross auger.

* * * * *